US006500245B1

(12) United States Patent
McCue et al.

(10) Patent No.: US 6,500,245 B1
(45) Date of Patent: Dec. 31, 2002

(54) THERMORESPONSIVE COLORING FORMULATION FOR USE ON REIMAGEABLE IMAGE CARRIER

(76) Inventors: Geoffrey A. McCue, 19884 25th St., Lawrence, KS (US) 66044; Sebastian V. Kanakkanatt, 2459 Audubon Rd., Akron, OH (US) 44320

( * ) Notice: Subject to any disclaimer, the term of this patent is extended or adjusted under 35 U.S.C. 154(b) by 0 days.

(21) Appl. No.: 09/500,709

(22) Filed: Feb. 9, 2000

Related U.S. Application Data

(62) Division of application No. 09/188,029, filed on Nov. 6, 1998.

(51) Int. Cl.$^{7}$ .............................................. C09D 11/00

(52) U.S. Cl. ............................... 106/31.16; 106/31.17; 106/31.37; 106/31.58

(58) Field of Search .......................... 106/31.16, 31.17, 106/31.58, 31.37

(56) References Cited

U.S. PATENT DOCUMENTS

| | | | | | |
|---|---|---|---|---|---|
| 2,616,961 | A | | 11/1952 | Groak | 358/501 |
| 3,212,898 | A | | 10/1965 | Cerreta | 430/345 |
| 3,346,385 | A | | 10/1967 | Foris | 430/275.1 |
| 3,562,172 | A | | 2/1971 | Ono et al. | 252/600 |
| 3,785,820 | A | * | 1/1974 | Inoue et al. | 96/48 R |
| 3,820,995 | A | | 6/1974 | Martens et al. | 430/336 |
| 3,964,385 | A | | 6/1976 | Knight | 89/43.01 |
| 4,006,983 | A | | 2/1977 | Pressman et al. | 399/135 |
| 4,117,497 | A | | 9/1978 | McGroddy et al. | 346/17 |
| 4,171,980 | A | * | 10/1979 | Ceintrey | 428/327 |
| 4,180,405 | A | * | 12/1979 | Lawton | 106/31.19 |
| 4,231,081 | A | | 10/1980 | Freeman | 358/507 |
| 4,237,207 | A | | 12/1980 | Ceintrey | 430/17 |
| 4,318,002 | A | | 3/1982 | Pressman et al. | 250/492.2 |
| 4,323,904 | A | | 4/1982 | Edwards et al. | 346/74.7 |
| 4,496,236 | A | | 1/1985 | Beaudet et al. | 399/307 |
| 4,518,468 | A | | 5/1985 | Fotland et al. | 205/204 |
| 4,822,631 | A | | 4/1989 | Beaudet | 427/469 |
| 5,048,417 | A | | 9/1991 | Everroad | 101/123 |
| 5,156,089 | A | | 10/1992 | McCue | 74/606 R |
| 5,233,918 | A | | 8/1993 | Hale | 101/122 |
| 5,285,244 | A | | 2/1994 | Bujese | 399/249 |
| 5,451,560 | A | | 9/1995 | Akada et al. | 503/227 |
| 6,084,702 | A | * | 7/2000 | Byker et al. | 106/31.17 |

OTHER PUBLICATIONS

Millington Direct Process Screen Printers with Self Contained Light/Millington Direct Process Screen Printing Frames, 2 pages, no date available.
Millington Vacuum Frames for Direct Process Stencils, 2 pages, no date available.
Brighten your Bottom Line with Color–Changing Inks, Screen Printing, Nov. 1998, pp. 12–20.

* cited by examiner

*Primary Examiner*—Helene Klemanski
*Assistant Examiner*—Veronica F. Faison
(74) *Attorney, Agent, or Firm*—Shook, Hardy & Bacon L.L.P.

(57) ABSTRACT

A thermoresponsive coloring formulation for use on a reimageable image carrier is provided. An image may be created by exposing the thermoresponsive coloring formulation to heat and erased by exposing it to white light.

A screen coated with an uncured stencil coating is placed in registration with the image carrier. The screen and image carrier are exposed to a curing agent which is prevented from passing beyond the image carrier in those areas covered by the image, while the areas of the coated screen that are exposed to the curing agent are hardened by the curing agent. After the stencil coating has been hardened in the desired areas, the screen is removed, and the uncured stencil coating is rinsed away from the screen, leaving a portion of the screen with open pores through which ink can flow.

8 Claims, 5 Drawing Sheets

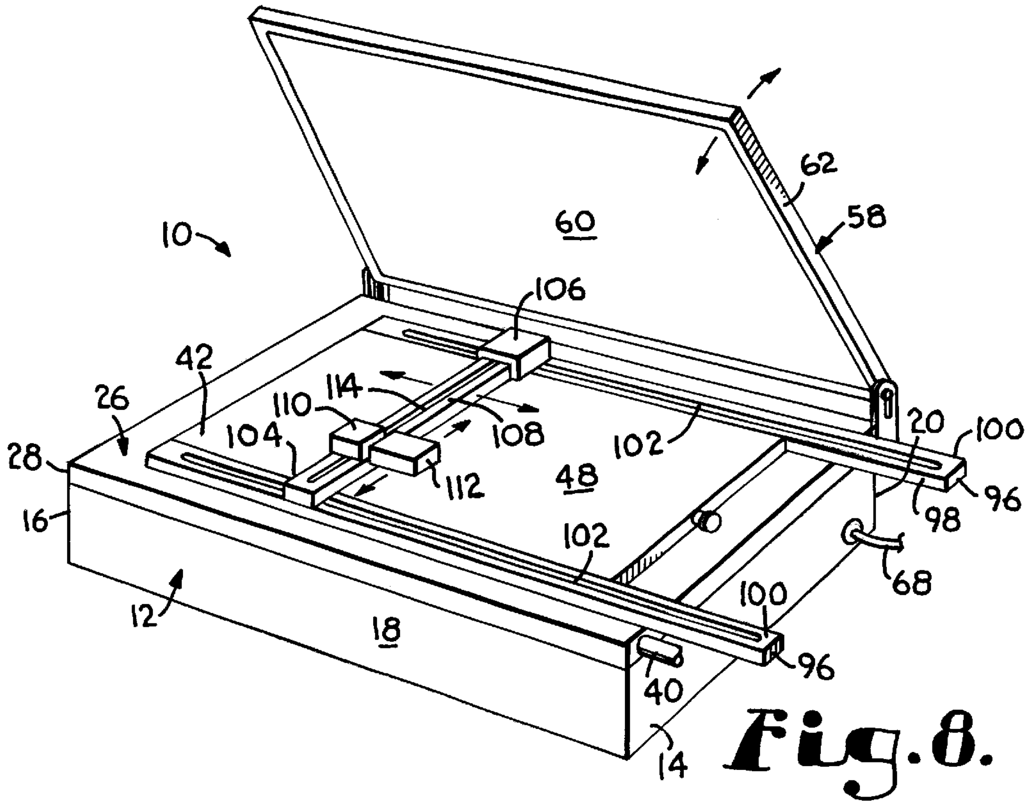
Fig. 8.
Fig. 9.
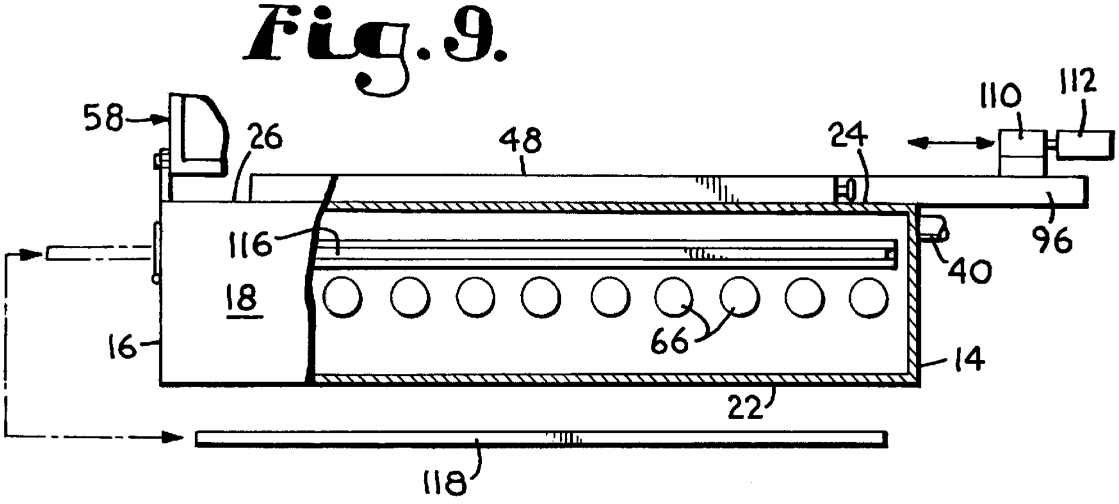

THERMORESPONSIVE COLORING FORMULATION FOR USE ON REIMAGEABLE IMAGE CARRIER

CROSS-REFERENCE TO RELATED APPLICATIONS

This application is a divisional of U.S. patent application Ser. No. 09/188,029 filed Nov. 6, 1998.

STATEMENT REGARDING FEDERALLY SPONSORED RESEARCH OR DEVELOPMENT

Not applicable.

BACKGROUND OF THE INVENTION

The present invention relates in general to screen printing devices and, more particularly, to a method and apparatus for preparing screens used in such devices.

In typical screen printing processes, ink is applied to a substrate, such as a shirt, poster or decals, through screens which have been prepared in a manner to allow ink to pass through only the desired portions of the screen to form the desired graphic on the substrate. In single, multi-color and four-color process screen printing processes, a separate screen is used for each color of ink which is applied to form the graphic on the substrate. The four-color process differs from multi-color processes in that only four ink colors are used to obtain the desired multi-colored pattern on the substrate.

In most screen printing machines, the screens are clamped on hinged arms which allow the screens to be raised and lowered in relation to the substrate. For example, in manually operated screen printing machines for shirts, the arms which hold the screens are arrayed in a spoke-like fashion and both the screens and the substrate are typically free to rotate to bring successive screens into position over the shirt or other substrate. In automatic screen printing machines, only the substrates rotate, typically in a circular configuration. Each screen is successively positioned over the substrate and is lowered onto the substrate. The ink is then applied through the screen and onto the substrate using a squeegee or pressurized plenum.

Conventional methods for preparing the screens used in screen printing processes have been both time consuming and expensive. One such method involves forming the graphic to be printed as a permanent opaque image on a transparent sheet. Thereafter, an unexposed light-sensitive emulsion or stencil coating is applied to the side of the screen that will contact the substrate to be printed. The graphic on the transparent sheet is then placed over the unexposed emulsion on the area of the screen through which ink flow is desired. The screen is then exposed to a light source which cures or hardens the areas on the screen which are not covered by the graphic on the transparent sheet. The open portions or pores of the screen which are covered with the stencil coating but which are not covered by the graphic on the transparent sheet are fixed in place after the screen is exposed to light. After this exposure to light, the transparent sheet bearing the graphic is removed from the screen and the unexposed stencil coating is removed from the screen by washing the screen with water. Therefore, the portions of the screen that were originally covered with the graphic on the transparent sheet will be open and permeable to the printing ink. At this time, the screen printing screen is ready for use in transferring ink onto the substrate to be printed. This is done by mounting the screen on the screen printing machine and moving the screen into registry over the substrate which is placed on a platen. Ink is then forced through the open pores of the screen onto the underlying substrate.

The above method is disadvantageous in forming a screen printing screen because it can be both expensive and time consuming. This method requires that new artwork, in the form of the transparent sheets, be formed each time a new graphic is to be printed on an object. Further, in order to ensure the proper orientation of the graphic on the object, the transparent sheet must be properly located or registered with respect to both the printing screen and the printing machine. This problem is accentuated when it is necessary to print a multi-colored graphic on the object which requires a number of different screen printing screens, one for each color in the graphic.

To address the deficiencies in the method described above, another method for preparing a screen printing screen has been developed and is described in U.S. Pat. No. 5,156,089. This method eliminates the need for forming a transparent sheet containing the graphic, but itself contains a number of disadvantages. In this second method, an unexposed light-sensitive emulsion layer or stencil coating is applied to the entire printing surface of a screen as in the previous method. The screen is then placed into an apparatus which prints the graphic directly onto the stencil coating with a liquid ink. In this method, therefore, the applied layer of ink replaces the graphic on the transparent sheet. The printing mechanism is controlled with a computer and prints the graphic dictated by the data provided. After the graphic has been printed on the stencil coating, the stencil coating is cured by exposing it to a light source. The printed graphic acts as an exposure mask or shield so that only the stencil coating which is not covered by the graphic is cured. After the stencil coating has been exposed, the screen is washed to remove the layer of liquid ink and unexposed stencil coating from the screen. Although this method eliminates the need for preparing the graphic on the transparent sheet, it also presents a number of disadvantages.

Utilizing the second method described above, it is necessary to ensure that the ink used in forming the graphic is compatible with the underlying light-sensitive stencil coating. Because some commercially available stencil coating materials are incompatible with some commercially available inks, the above process limits the materials that can be used for the coating material and the inks that can be used therewith.

Using the above method also requires that the ink coating placed on top of the stencil coating be sufficiently optically or physically dense to prevent the underlying stencil coating from curing or hardening when exposed to light. If the ink coating is not sufficiently optically or physically dense, the stencil coating under the ink can harden, thus creating an unusable screen printing screen. It is often necessary to apply multiple layers of ink to ensure that a sufficient ink barrier is created so that a usable screen printing screen is created. Providing additional layers of ink on top of the stencil coating adds both time and expense to the process of creating a screen printing screen.

Thus, a method and apparatus for preparing a screen printing screen are needed which can overcome the above disadvantages. Specifically, a method for preparing a screen printing screen is needed that will lessen the time needed for preparing such a screen, while at the same time improving the quality of the screen that is made.

SUMMARY OF THE INVENTION

It is therefore an object of the present invention to provide an improved method for making a screen printing screen in which the time required to produce the screen printing screen is reduced by eliminating the need to manufacture a transparent sheet with a permanent graphic printed thereon.

It is another object of this invention to provide a method and apparatus for making a screen printing screen that eliminates the need to separately print onto the screen an image used to block a curing agent from the coating material so that the screen printing screen may be more efficiently formed.

It is yet another object of this invention to provide a method and apparatus for making a screen printing screen that allows the graphic used in forming the screen printing screen to be quickly changed and modified so that the screen is more efficiently formed.

According to one aspect of the present invention, the foregoing and other objects are achieved by a method of preparing a screen printing screen whereby a screen is coated with an uncured stencil coating material and placed in registration with an image carrier. The image carrier is supplied with an image through the use of a computer so that the image may be readily modified or changed. After the image carrier is supplied with an image, the screen and the image carrier are exposed to a curing agent, such as a light source which may be integral with the image carrier or may be contained within a separate exposing frame. The curing agent is prevented from passing beyond the image carrier in those areas covered by the image, while the areas of the stencil coating that are exposed to the curing agent are hardened by the curing agent. After the stencil coating has been hardened in the desired areas, the screen is removed and the uncured stencil coating is rinsed away from the screen, leaving a portion of the screen with open pores through which ink can flow.

In another aspect of the invention, an apparatus for preparing a screen printing screen is provided that includes an exposing frame which houses a light source. On top of the exposing frame is placed a vacuum frame which can be connected to a suitable vacuum source. A thermoresponsive or photochromic material, which includes a substrate coated with a coloring formulation, is placed on top of the vacuum frame and functions as the image carrier by blocking light passage therethrough in selected areas.

The coloring formulation used to create the thermoresponsive or photochromic material includes a mixture of a color changing dye or pigment, a compound that activates the color changing dye, and a solvent. The compound that activates the color changing dye acts in conjunction with the color changing dye so that when these components are mixed a coloring formulation is created. In some instances, the compound that activates the color changing dye also functions as a resin or a binder. The substrate, which is coated with the coloring formulation, may be any material that is white, clear, or lightly colored.

The image carrier, which is a thermoresponsive or photochromic material, will initially be the color of the substrate. An image is suppled to the thermoresponsive or photochromic material by heating or UV exposing, respectively, certain areas of the material causing these areas to change to a darker color and become more optically dense or physically dense. This darker coloration on the thermoresponsive material can be erased by white light, and the darker coloration on the photochromic material can be erased by heat. This image carrier made of a thermoresponsive or photochromic material may undergo a large number of cycles of coloration and erasing. Alternatively, the image carrier may be made of a static chargeable material, which includes a substrate coated with an electrically responsive component, that can be charged in certain areas to create an image that blocks light.

A screen coated with an uncured stencil coating is placed on top of the image carrier made of the thermoresponsive, photochromic, or static chargeable material, and a flexible vacuum blanket is pivotally secured to the vacuum frame so that it can be lowered over the screen. The light source is located within the exposing frame so that light from the light source can be communicated through the vacuum frame and through selected portions of the image carrier. The image carrier made of the thermoresponsive, photochromic, or static chargeable material will allow light to pass through those areas that are not optically or physically blocked because they have not been exposed to heat, UV light, or an electrostatic charge, respectively, so as to be more optically or physically dense. The apparatus can thus be used to form a screen printing screen by curing selected portions of the stencil coating on the screen through the use of the light source and the image carrier.

In still another aspect of the invention, an apparatus for preparing a screen printing screen is provided that includes an exposing frame which houses a light source. On top of the exposing frame is placed an image carrier that is connected to a computer capable of supplying the image carrier with an image. A screen coated with an uncured stencil coating is located in spaced relation from the image carrier and a first fiber end block is placed against the screen while a second fiber end block is placed against the image carrier. The first and second end blocks are connected with a plurality of fiber optic bundles so that the second end block can communicate light to the first end block. The light sources are located within the exposing frame so that light from the light sources can be communicated through the exposing frame and through selected portions of the image carrier. The image carrier will allow light to pass through those areas which are not blocked by the image supplied thereto. The second end block allows the light which has passed through the image carrier to be passed through the fiber optic bundles to the first end block and to the screen. The pattern of light passing through the image carrier will be maintained by the end blocks and fiber optic bundles and communicated in the same pattern to the screen. The apparatus can thus be used to form a screen printing screen by curing selected portions of the stencil coating on the screen through the use of the light sources and the image carrier.

BRIEF DESCRIPTION OF THE DRAWINGS

In the accompanying drawings which form a part of the specification and are to be read in conjunction therewith and in which like reference numerals are used to indicate like parts in the various views:

FIG. 8 is a partially schematic perspective view of an apparatus for making a screen printing screen according to the present invention using a reimagable image carrier and a printing mechanism for imaging the image carrier; and FIG. 9 is a front elevation view of the apparatus of FIG. 8, with parts being broken away to show particular details of construction.

DETAILED DESCRIPTION OF THE PREFERRED EMBODIMENTS

Figure 1:
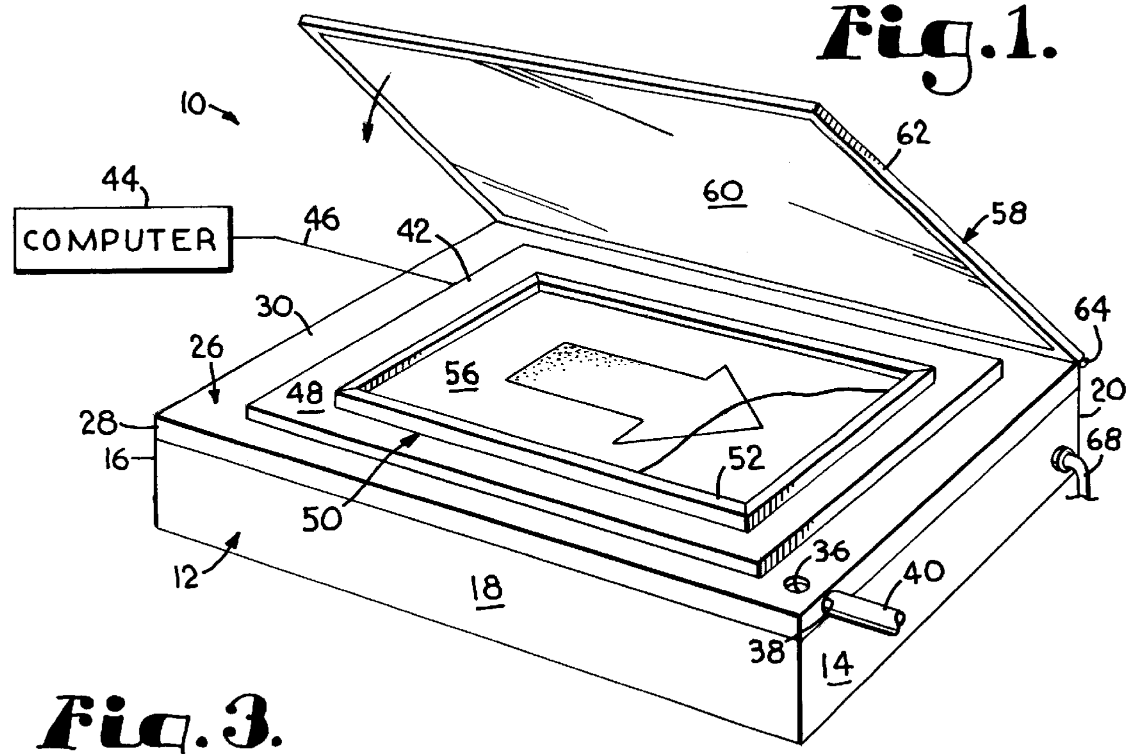
FIG. 1 is a partially schematic perspective view of an apparatus for making a screen printing screen according to the present invention.
Figure 2:
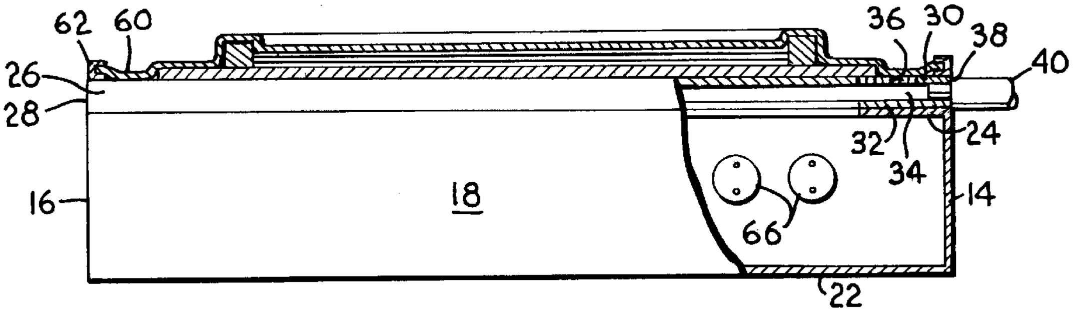
FIG. 2 is an end elevation view of the apparatus of FIG. 1 with portions broken away to show internal components.

Referring now to the drawings in greater detail and initially to FIG. 1, a screen preparation apparatus in accordance with the present invention is represented broadly by the numeral 10. Apparatus 10 is used to quickly and efficiently form a screen printing screen. Apparatus 10 includes an exposing frame 12 which is composed of opposing side walls 14 and 16, front wall 18 and rear wall 20. Side walls 14 and 16 are joined with front wall 18 and rear wall 20 to form a generally rectangular shape. Exposing frame 12 has a bottom wall 22 that is connected to and covers the entire area defined by side walls 14 and 16, front wall 18 and rear wall 20. Exposing frame 12 further includes a top wall 24 which is coupled to the interior, upper-most portions of side walls 14 and 16, front wall 18 and rear wall 20. Top wall 24 extends inwardly only a short distance from side walls 14 and 16, front wall 18 and rear wall 20 as best seen in FIG. 2. Therefore, top wall 24 does not cover the entire area defined by side walls 14 and 16, front wall 18 and rear wall 20. Exposing frame 12 thus forms a generally rectangular box with an interior that is surrounded on all sides and on the bottom, but which has an open area on the top portion thereof. This open area may optionally be covered by a sheet of clear material, such as plexiglass. It is through this open area that light will pass, as is more fully described below.

Disposed on top of exposing frame 12 is a vacuum frame 26 that has an outer perimeter defined by a perimeter wall 28 that matches the perimeter of exposing frame 12. Coupled with perimeter wall 28 is an upper wall 30 and a lower wall 32. Perimeter wall 28, upper wall 30 and lower wall 32 act cooperatively to form an interior volume 34 as best seen in FIG. 2. Upper wall 30 and lower wall 32 of vacuum frame 26 extend inwardly from perimeter wall 28 only a partial distance as is best seen in FIG. 2. Therefore, upper wall 30 and lower wall 32 leave a generally rectangular open area in the center of vacuum frame 26. Alternatively, upper wall 30 and lower wall 32 may contain a sheet of clear material, such as plexiglass, in this open area. Similar to the open area in exposing frame 12, the open area in vacuum frame 26 is provided to allow light to communicate therethrough, the importance of which is described more fully below.

Extending through an inlet port 38 in vacuum frame 26 is a vacuum tube 40 through which air can be drawn. Vacuum tube 40 is connected to a vacuum (not shown) which can be activated to draw a flexible cover 60 against a screen 50 and an image carrier 42, which are more fully described below. Extending through upper wall 30 is a vacuum hole 36 which allows communication between interior volume 34 and the enviroment exterior to upper wall 30.

Placed on top of upper wall 30 is an image carrier 42. Image carrier 42 is a device that can be selectively supplied with an image that substantially prevents light flow therethrough in the area of the image. Image carrier 42, in one embodiment, is a large format, monochrome, LCD or plasma screen as is well known to those in the computer art. In this embodiment, image carrier 42 is of generally rectangular shape and rests on top of upper wall 30 so that it completely covers the open area defined by upper wall 30. Image carrier 42 has coupled thereto a computer 44, shown schematically in FIG. 1. Computer 44 communicates to image carrier 42 through a cable 46, again shown schematically in FIG. 1. Computer 44 is equipped with software that is used to supply image carrier 42 with a variety of images to block the flow of light through image carrier 42 to form a screen printing screen as is more fully set out below.

In an alternative embodiment a reimagable material such as, a thermoresponsive, photochromic, or static chargeable material is used as image carrier 42. In this embodiment, computer 44 is again used to supply image carrier 42 with the image. Computer 44 drives a carriage 104 containing an activating mechanism that can alter the characteristics of the image carrier upon contact, in these cases, with heat energy, UV light, or an electrical charge.

When a thermoresponsive or photochromic material is used as the image carrier, a substrate is coated with a coloring formulation that includes a color changing dye. Because this color changing dye in the pure form does not undergo coloration upon exposure to UV light or heat, the coloring formulation must also include a compound that activates the color changing dye. Preferably, the color changing dye is a spiropyran or a combination of spiropyrans that are capable of undergoing color changes upon activation and deactivation. The compound that activates the color changing dye may include, but is not limited to, a polymer containing a nitro group, an acrylic resin, a cellulose resin, an alkyd resin, a vinyl resin, or combinations thereof.

Examples of spiropyrans that may be used in forming the coloring formulation may be a spirobenzopyran or a spironaphthopyran. These spiropyrans may be compounds having mono-nitro or di-nitro substituents. Examples of compounds that may be used include, but are not limited to, 6-nitro-1',3',3'-trimethyl spiro[2H-1-benzopyran-2',2'-indoline], 8-methoxy-6-nitro-1',3',3'-trimethyl spiro[2H-1-benzopyran-2',2'-indoline], 8-nitro-1',3',3'-trimethyl spiro [2H-1-benzopyran-2',2'-indoline], 6-methoxy-8-nitro-1',3',3'-trimethyl spiro[2H-1-benzopyran-2',2'-indoline], and 6,8-dinitro-1',3',3'-trimethyl spiro[2H-1-benzopyran-2',2'-indoline], 6-nitro-1',3',3'-trimethyl spiro [2H-1-naphthopyran-2',2'-indoline] 8-methoxy-6-nitro-1',3',3'-trimethyl spiro[2H-1-naphthopyran-2',2'-indoline], 8-nitro-1',3',3'-trimethyl spiro[2H-1-naphthopyran-2',2'-indone], 6-methoxy-8-nitro-1',3',3'-trimethyl spiro[2H-1-naphthopyran-2',2'-indoline], and 6,8-dinitro-1',3',3'-trimethyl spiro [2H-1-naphthopyran-2',2'-indoline].

The color changing dye used in this formulation functions as a positive thermochromic or photochromic dye. When a spiropyran is used to provide a photochromic dye, preferably, it is activated by an acrylic resin so as to change to a darker color upon exposure to UV light and to lose color upon exposure to heat. When a spiropyran is used to provide a positive thernochromic dye, preferably, it is activated by a polymer containing a nitro group so as to change to a darker color upon exposure to heat and to lose color upon exposure to white light or visible light. This polymer having a nitro group may be nitrocellulose, an acrylic polymer having a nitro group, or any other polymer having a nitro group. It acts in conjunction with the spiropyran to absorb heat and to aid in the coloration process. Preferably, cellulose mononitrate, cellulose dinitrate, or cellulose trinitrate is used with a spiropyran in forming the coloring formulation when a thermoresponsive material is desired. In summary, using the nitro groups in place of the acrylic resin reverses the behavior of the spiropyran photochromic dyes and transforms them into positive thermochromic dyes.

The solvent used in making the coloring formulation may be an alcohol, an acetate, a ketone, water, glycol ether, or a mixture of these solvents. Still further, the solvent may be aliphatic and/or aromatic. The alcohols that may be used in this formulation should have from three to six carbon atoms, and preferably from three to four carbon atoms. Most preferably, n-propyl alcohol or isopropyl alcohol is the alcohol used in this formulation. The acetate that may be used in this formulation may have from two to seven carbon atoms and preferably from two to four carbon atoms. Most preferably, the acetate is n-propyl acetate or ethyl acetate. The ketone that may be used in this formulation may have from three to eight carbon atoms. Preferably, the ketone used in this formulation is acetone. Most preferably, the solvent used in the mixture is about a 50/50 mixture by volume of an alcohol and an acetate. In addition, flow additives and/or pH additives may be included in the coloring formulation, as optional components.

The coloring formulation may include from about 0.1–10% by weight color changing dye and about 1–25% by weight of a compound that activates the color changing dye with the balance of the solution including one or more solvents. Preferably, the coloring formulation includes about 1–2% by weight spiropyran, about 5–10% by weight nitrocellulose or acrylic resin, and the balance of the mixture including a 50/50 mixture by volume of an alcohol and acetate. All percentages used throughout this application are percentages by weight unless otherwise noted.

The coloring formulation is made by combining the color changing dye, the compound that activates the color changing dye, and the solvent. These components are then mixed for an effective period of time. The order in which components are added is not critical. This process can be scaled to make any desired quantity of the formulation.

One preferred method of making the coloring formulation includes dissolving the color changing dye in the solvent before adding the activating compound. Another preferred method of making the coloring formulation includes dissolving the activating compound in the solvent before adding the color changing dye. Once both color changing dye and the activating compound are dissolved in the solvent, the coloring formulation may be used to coat a substrate.

The substrate, to which the coloring formulation is applied, may be any material that is white, clear, or lightly colored, such as cellulose-based paper, plastic, glass, hard wood, ceramic, or metal. Preferably, the substrate is clear plastic if it is to be used as an image carrier. More specifically, if the substrate is a plastic, it may be a plastic sheet, a plastic film, or a plastic matrix wherein the coloring formulation is mixed within the matrices of the plastic before it hardens. A plastic matrix containing coloring formulation is made by casting a polymer solution used to form the plastic into a thin sheet, peeling off this thin sheet, and extruding it with the coloring formulation. If a plastic is used as the substrate, it may be, but is not limited to, polyester, polyethylene, polyvinyl chloride, polypropylene, polycarbolate, or a nitrocellulose material such as a cellophane sheet.

Rather than including the coloring formulation in a polymer matrix, another way the coloring formulation may be applied is to coat the surface of the substrate. This may be done in a number of different ways including applying the formulation to the substrate such as by using a wire rod, spraying the formulation onto the substrate, roller coating, knife coating, or dipping the substrate in the coloring formulation. Although the drying time varies somewhat upon the thickness of the coating, the coating dries in about 30 minutes if at about 20–25° C. and dries in about 30 seconds if at 80° C. Preferably, the thickness of the coating on the substrate is about 15–30 microns ($\mu$m).

In use, the color changing article is initially the color of the substrate. In response to temperature or UV light variations, it is capable of changing from one state permitting passage of light of a preselected spectrum to another state blocking passage of the selected light spectrum, either optically or physically. Preferably, the color changing article changes to a red color or a black color when used as an image carrier. Red color is of a particular optical density so as to provide optical blockage of UV light, the preferred curing agent for curing the stencil coating, via a filtering effect. Black color is of sufficient density so as to physically block UV light.

Upon heating, the thermoresponsive material will darken in color. Preferably, the thermoresponsive material includes a color changing formulation that is formulated to change colors upon exposure to heat in the temperature range of between about 68 and 296° F. Most preferably, this color changing formulation is formulated so as to change color upon exposure to heat in the temperature range of between about 120 and 200° F. In this most preferred embodiment, the image created on the thermoresponsive material does not fade at temperatures below about 120° F., until it is erased. This darker coloration on the thermoresponsive material can be erased by visible light or white light. Preferably, the white light used to erase the thermoresponsive material includes an even distribution of the spectrum so as to ensure that light having a wavelength between about 400 and 700 nm is provided. Most preferably, the colored substrate is exposed to light having a wavelength between about 500 and 650 mn, which is the green-yellow region of the white light spectrum.

The photochromic material changes to a darker color upon exposure to UV light, which is light having a wavelength of about 270–280 nm or about 360–370 nm. For example, the to photochromic material may change color upon exposure to sunlight, because sunlight contains UV light. The color of the photochromic material fades upon exposure to heat. Even the heat at room temperature is sufficient for the color of the photochromic material to fade slowly. If a photochromic material is used as the image carrier, it must change colors in response to a different light wavelength from that of the curing agent. For example, if the curing agent is UV light having a wavelength of about 270–280 nm and the image carrier is a photochromic material activated by UV light, then it should be formulated to change colors in response to UV light having a wavelength of about 360–370 run or vice versa.

A large number of cycles of coloration and erasing can be accomplished with this color changing article. The coloration is reversible no matter what embodiment of the present invention is used to affect coloration.

The following structures show the closed forms of these color changing dye molecules. The closed form is the colorless form; that is, the form they are in before exposure to heat or UV light.

Closed F or ms

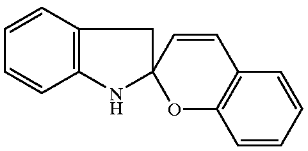

Spiroindolinobenzopyran

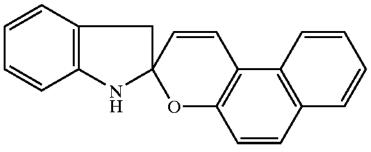

Spiroindolinonaphthopyran

When the dyes in the above closed forms are exposed to heat or UV light in the presence of an activating compound, they undergo ring opening to give rise to the colored form. The structures of the colored form, or merocyanine forms, are shown below.

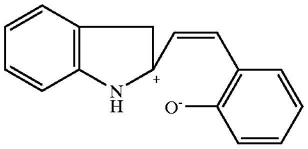

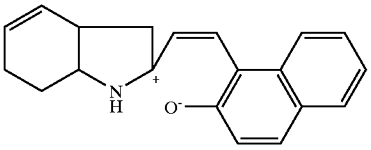

The generalized illustration of this ring opening (coloration) and ring closing (fading) mechanism is shown below.

A B

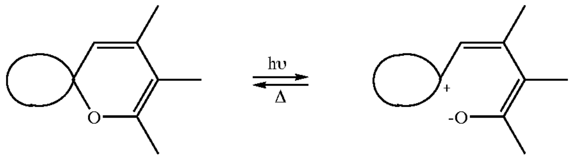

Generalized closed form (colorless) Generalized merocyanine (open) form (colored)

Figure 7:
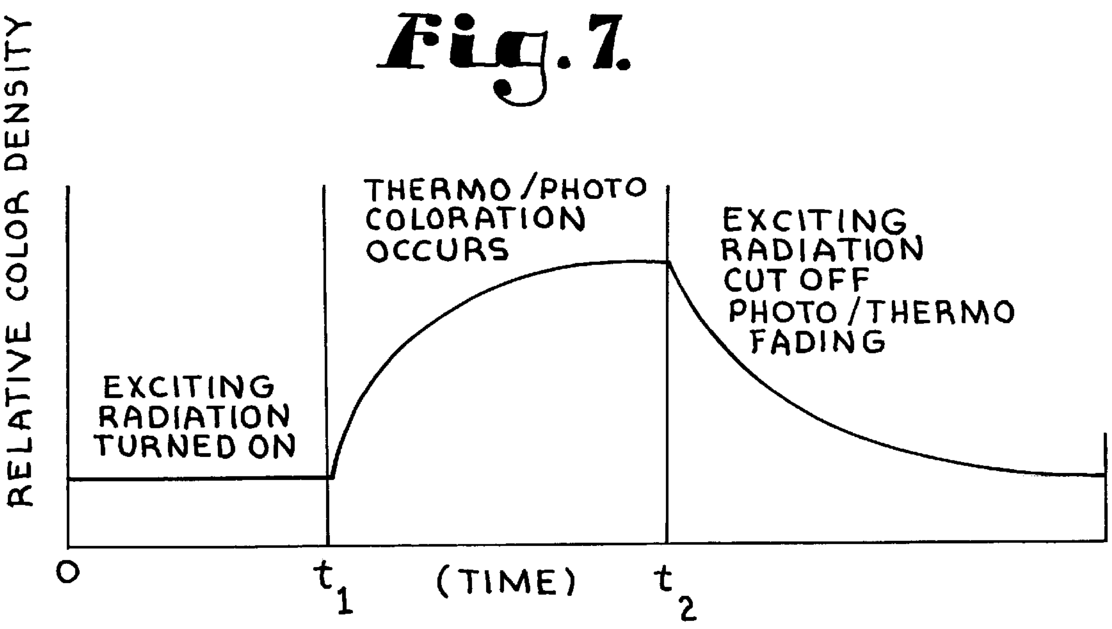
FIG. 7 is a graph representing typical behavior of photochromic and thernoresponsive materials.

These reversible color changes occur only in the molten state or in the appropriate media such as a polymer containing a nitro group or an acrylic resin. The typical behavior of photochromic and thermoresponsive materials is shown in FIG. 7. The exciting radiation is UV light in the case of photochromic materials and is heat in the case of thermoresponsive materials. The color fades over time when the exciting radiation is cut off and the photochromic or thermoresponsive material is in the presence of heat or white light, respectively.

The shades of color developed by the above families of positive thermochromic or photochromic dyes on exposure to heat or UV light depend on 1) the specific nature of side groups attached to the basic structure and the locations thereof, and 2) the medium in which the dyes are dispersed. The times of coloration and fading as well as the effective wavelengths of the radiations which effect coloration also depend on the side groups and the medium.

When the thernoresponsive material is dipped in hot water, exposed to hot air or to heat from any source, it will change to a darker color. The time for this coloration will vary with the temperature of water approximately as follows:

| Temperature | Time for Coloration |
|---|---|
| 90° C. | 1 sec. |
| 80° C. | 5 sec. |
| 70° C. | 30 sec. |
| 60° C. | 5 min. |
| 50° C. | 30 min. |
| 40° C. | 2 hrs. |
| 30° C. | 6 hrs. |
| 25° C. | 12 hrs. |

When the darker colored material is exposed to white light such as that of an overhead projector, fading will occur. The time of fading will also depend on the temperature of the coated material and is approximately as follows:

| Temperature | Time to Fade |
|---|---|
| 30° C. | 1 sec. |
| 25° C. | 40 sec. |
| 20° C. | 3 min. |

The thickness of the coloring formulation coating affects the fading time when the image carrier is exposed to a projector light as follows:

| Thickness | Time to Fade at 22° C. |
|---|---|
| 5 μm | 20 sec. |
| 15 μm | 1 min. |
| 30 μm | 5 min. |
| 60 μm | 20 min. |
| 100 μm | 2 hrs. |
| 200 μm | 6 hrs. |

The following are examples of thermoresponsive or photochromic materials that may be used as image carriers and methods of making the same that are within the scope of the present invention. These examples are not meant in any way to limit the scope of this invention.

EXAMPLE 1

Thermoresponsive Material

Five grams of cellulose trinitrate (nitrocellulose) were dissolved in 100 grams of a solvent mixture containing ethyl acetate (80%), butylacetate (10%), and isopropyl alcohol (10%) (each percentage is by volume). Five-tenths of a gram of 6-nitro-1',3',3'-trimethyl spiro[2H-1-benzopyran-2',2'-indoline] were dissolved in the above nitrocellulose solution. The final mixture was spread on a thin sheet of polyester plastic. It was allowed to dry at room temperature and a yellow coating formed. When dried with a hot hair dryer, it turned red. The red coated sheet was exposed to sunlight where the red color disappeared in several minutes.

EXAMPLE 2

Thermoresponsive Material

Two grams of 6-nitro-1',3',3'-trimethyl spiro [2H-1-benzopyran-2',2'-indoline] were dissolved in a clear nitrocellulose lacquer manufactured by the Egyptian Lacquer Mfg. Co., Fort Granger Dr., Franklin, Tenn. 336064. This nitrocellulose lacquer includes 10 wt % cellulose trinitrate, 40 wt % ethyl acetate, 41 wt % isopropyl acetate, and 9 wt % isopropanol. This mixture was allowed to sit overnight to make sure that the dissolution was complete. The resulting solution was screen printed on polyester films. Sheets of clear plastic made of polyester also were dipped in the above solution and allowed to dry.

These coated sheets turned red on dipping in hot water at about 80° C. These red sheets of coated paper were exposed to the light from an overhead projector for several minutes, and the red color was erased. The cycle of coloration in hot water and erasing in the white light of the overhead projector was repeated several times without any apparent change in the color density or erasing time.

EXAMPLE 3

Photochromic Material

Two grams of 8-methoxy-6-nitro-1',3',3'-trimethyl spiro [2H-1-benzopyran-2',2'-indoline] were dissolved in a styrene varnish, which contained approximately 30 wt % acrylic resin dissolved in a 50/50 mixture by volume of n-propyl alcohol and n-propyl acetate. This solution was spread on plastic sheets by a wire-wound rod and allowed to dry. The film was light blue in color. On exposure to UV light, blacklight, or sunlight, an intense blue color appeared. This was erased slowly in about two hours at room temperature, but on dipping the film in hot water at about 80° C., the blue color was erased immediately.

EXAMPLE 4

Thermoresponsive Material

Two grams of 8-nitro-1',3',3'-trintro-1',3',3'-trimethyl spiro[2H-1-benzopyran-2',2'-indoline] were dissolved in 98 grams of clear nitrocellulose lacquer manufactured by the Egyptian Lacquer Mfg. Co. by stirring and leaving the solution overnight to complete dissolution. This nitrocellulose lacquer included 20 wt % nitrocellulose, 35.6 wt % ethyl acetate, 336.4 wt % isopropyl acetate, and 8.0 wt % isopropanol. The mixture was spread on a 12" by 12" teflon tile, and the solvent was allowed to evaporate for 24 hours when exposed to heat. The film so formed was peeled off from the teflon base. The film was intensely colored red when exposed to heat. The red color was erased on exposure to sunlight or to the white light from a projector for several minutes. When the film was dipped in hot water at above 80° C., it turned to red in 2 to 3 seconds. The cycle of coloration in hot water and erasing of the color by white light was repeated several times without any apparent change in color density or in the time for coloration or erasing at a given temperature.

EXAMPLE 5

Thermoresponsive Material

Two grams of 6-methoxy-8-nitro-1',3',3'-trimethyl spiro [2H-1-benzopyran-2',2'-indoline] were mixed with 98 grams of clear nitrocellulose lacquer manufactured by the Egyptian Lacquer Mfg. Co. by stirring and allowing the dissolution to be completed overnight. This nitrocellulose lacquer included 10 wt % nitrocellulose, 40 wt % ethyl acetate, 41 wt % isopropyl acetate, and 9 wt % isopropanol. The solution was used to coat white paper using the screen printing method and by the dip coating method. The screen printing was done only on one side. The dip coating coated both sides.

When dry, the paper showed a purple color which was erased on exposure to white light for several minutes. The paper did not go to the original white color, but retained a slight purple color. Also, coloration occurred on exposure to UV light as well.

EXAMPLE 6

Thermoresponsive Material

One gram of 6,8-dinitro-1',3',3'-trimethyl spiro[2H-1-benzopyran-2',2'-indoline] was dissolved in clear nitrocellulose lacquer manufactured by the Egyptian Lacquer Mfg. Co. This nitrocellulose lacquer included 5 wt % nitrocellulose in a solvent mixture of isopropyl acetate, ethyl acetate, and isopropanol in the ratio of 1.8:2.5:2.0 by volume (28.%; 39.7%; and 31.8% by volume, respectively). This solution was spread on clear plastic film and dried at room temperature for 24 hours. The film turned intensely red and the color was erased on exposure to white light either from the sun or a projector in several minutes. The cycle of coloration by heat and erasing by white light was repeated several times. No decrease in the coloring ability or erasing characteristics was observed.

When a static chargeable material is used as the image carrier, it includes a substrate coated with an electrically responsive component such as a static chargeable media. The static chargeable media may be any substance that in response to an electrical charge is capable of changing from one state that permits passage of light of a pre-selected spectrum to another state that blocks passage of the selected light spectrum. The media generally includes a negatively charged resin, which is the electrically responsive component and which also acts as a film forming agent, and a solvent that acts as a stabilizer. Preferably, the media includes about 30–40% by volume resin and about 60–70% by volume solvent. The media is applied to a substrate and then dried so as to form a static chargeable material. The static chargeable material is then charged in certain areas making these areas more optically dense. When the static chargeable material is used as an image carrier, the charged areas act to block light during the curing process.

As best seen in FIG. 8, to provide the image to image carrier 42, mechanism 112 is directed across the image carrier. Computer 44 communicates with the printing mechanism and directs it to transport heat energy, UV light, or an electrostatic charge to certain portions of the image carrier so that the desired thermally or photochromically colored image or the desired electrostatic image is formed on the image carrier. The more optically or physically dense portions of image carrier 42, which are the areas that have been exposed to heat energy, UV light or an electrostatic charge, thus operate to block the passage of light therethrough. Other forms of energy could be used to form the image when image carrier 42 is made from formulations compatible with the appropriate energy.

More specifically, mechanism 112 such as a thermal printhead, a photochromic printhead, or an electrostatic printhead is used to image the image carrier with desired graphics from a computer. These heads can be mounted on a stand-alone device, such as a conventional printer, or mounted as a component of the exposure unit. The head moves across the surface of the image carrier creating an image on it.

The thermal printhead may be an electric resister or a thermal laser. One type of electric resister thermal printhead that may be used is a THERMO ELECTRIC RESISTER HEAD available from OYO Instruments, 9777 West Gulf Bank, Suite 10, Houston, Tex. 77057. This THERMO ELECTRIC RESISTER HEAD printhead uses tiny resisters that are heated by electrical current and when placed in contact with the coating, change the coating from clear to an optically or physically dense color. Another example of a thermal printhead is the ASPECT printer available from Autotype Americas, 2050 Hammond Drive, Schaumburg, Ill. 60173. One example of an electrostatic printhead is the ELECTRICAL SPARK IGNITOR SYSTEM available from the Gestetner Company, which is affiliated with Savin Corporation, 599 West Putnam Ave., Greenwich, Conn. 06836-2656. This type of printhead uses a series of electrodes that create sparks. The heat generated at the apex of the spark is sufficient to cause a color change in the coating.

Once an image is created on image carrier 42, a stencil coating 56 on screen 50 is cured, as is more fully described below. Preferably, this is done by directing UV light through image carrier 42, wherein those areas not optically or physically blocked by the image allow the light to pass through to the stencil coating 56. The areas of the stencil coating, which are exposed to UV light are cured.

Once the stencil coating 56 on screen 50 is cured, the image on the image carrier is erased. As discussed previously, the thermoresponsive material and the photochromic material are erased by white light and heat, respectively. The static chargeable material is erased by discharging the areas that are electrically charged. More specifically, discharging can be done in a number of ways, including exposing the surface to a grounded roller or reversing the polarity of the printhead and passing the printhead over the surface to discharge the area.

Images on all these types of material may be erased by running the same printhead that was used to color the material or a separate clearing head unit over the image so as to reverse and clear the image. The image carrier is now ready for subsequent imaging. In alternate embodiments of this invention, the image carrier can be separate from the screen printing apparatus for use in a variety of applications. In addition to screen printing applications, the reimagable image carriers described above, which can be but are not limited to thermoresponsive, photochromic, or electrostatic materials, may be used for other printing applications such as for making flexographic plates, making lithographic printing plates, making printed circuit boards, or making re-usable facsimiles or photocopy machine paper.

One embodiment of the apparatus of the present invention, which includes a printing mechanism as part of the apparatus, is shown in FIGS. 8 and 9. Disposed on opposite sides of the top surface of vacuum frame 26 are parallel side rails 96 that preferably are fixed, but may be adjustable inwardly and outwardly on the top surface of vacuum frame 26 to accommodate image carriers of various sizes. Side rails 96 are typically rectangular and each has an inner surface 98 and a top surface 100. Depending into side rails 96 from top surface 100 are slots 102. Slots 102 extend lengthwise along side rails 96 and extend a partial distance downwardly from top surface 100. Slots 102 are used to accommodate a drive mechanism as is more fully described below.

Disposed perpendicularly to side rails 96 is a carriage 104 that is coupled with a carriage motor 106. Carriage 104 is generally rectangular and, along with carriage motor 106, rests on top surface 100 of side rails 96. Protruding downwardly from carriage motor 106 and carriage 104 into slots 102 is a drive pin which is not shown. The drive pin is used to propel carriage 104 back and forth lengthwise along side rails 96. The drive mechanism used to propel carriage 104 can be a cable, belt or rack and pinion system as is well known in the printing art. Thus, carriage motor 106 cooperates with side rails 96 to move carriage 104 lengthwise along the side rails.

Disposed on a riding surface 108 of carriage 104 is a print motor 110. Coupled to print motor 110 is a printing mechanism 112 that extends horizontally outwardly therefrom. Printing mechanism 112 can be any of the printheads described above, including but not limited to, a thermal printhead, a photochromic printhead, or an electrostatic printhead.

Print motor 110 has a drive pin (not shown) that protrudes downwardly into a slot 114 that extends lengthwise along carriage 104 in a manner similar to that described above for carriage motor 106. Specifically, print motor 110, and therefore print mechanism 112, can be moved along carriage 104 through the use of a cable, belt or rack and pinion system as is well known in the art. Slot 114 is capable of accommodating each of these drive systems. Thus, print motor 110 moves itself and print mechanism 112 along the length of carriage 104.

A cable (not shown) connects print motor 110, print mechanism 112 and carriage motor 106 to a computer (not shown). This computer is responsible for directing the travel of both carriage motor 106 and print motor 110 and is equipped with software to achieve this function, as is well known in the art. Further, this computer is responsible for controlling the operating of print mechanism 112.

The printing mechanism is used according to the method described below. First, the image desired to be printed onto the image carrier is designed using the software in the computer that is connected to the print motor 110, print mechanism 112, and carriage motor 106. Image carrier 42 is located on the top surface of vacuum frame 26 and is secured in place by adjusting side rails 96. Print mechanism 112 is then moved to a known reference location on image carrier 42, such as a corner of image carrier 42. This reference location is communicated to and is known by the computer attached to the print motor 110, print mechanism 112, and carriage motor 106, which thereafter directs print motor 110 to move across image carrier 42 along carriage 104. As print motor 110 and print mechanism 112 move across image carrier 42 along carriage 104, this computer further directs print mechanism 112 to transport the desirable form of energy, such as heat energy, UV light, or an electrostatic charge, onto certain portions of image carrier 42 so that the desired thermally or photochromically colored image or the desired electrostatic image is formed on image carrier 42.

Still further, as shown in FIG. 9, light filters 116 and 118 may be interchanged depending upon the type of light that is desired. For instance, light filter 116 could allow UV light to pass through so that it could be placed within the screen printing apparatus in order to cure the stencil coating 56 on screen 50. Then, light filter 118 could allow white light to pass through so that it could be placed within the screen printing apparatus, in place of light filter 116, in order to erase an image on image carrier 42 where image carrier 42 is a thermoresponsive material.

In still another embodiment, image carrier 42 can be a very high resolution, flat screen, large format monochrome monitor. In this embodiment, image carrier 42 fulfills the dual role of both the imaging device and the exposing device. As in each of the above embodiments, computer 44 is used to supply image carrier 42 with the desired image.

Disposed on a support surface 48 of image carrier 42 is a screen 50 which is composed of an outer frame 52 and a mesh fabric 54 which is stretched across frame 52 and held securely thereto. Mesh fabric 54 is preferably a polyester mesh that is made of individual fibers which are woven together to form the fabric. The individual fibers are woven in spaced apart relation so that open areas or pores are created through which ink will eventually flow onto a substrate. An uncured stencil coating material 56 is applied to polyester mesh fabric 54 on screen 50. Stencil coating 56 is preferably applied to the top surface of polyester mesh fabric 54 and can be any number of the light-sensitive stencil coatings which are well known in the art, such as: AQUASOL-ER available from Murakami Screen U.S.A., Inc. of Montery Park, Calif., which is a PVA-SBQ pure photopolymer direct emulsion. Stencil coating 56 merely needs to be a coating material that may be applied to screen 50 in liquid or other form and which can thereafter be hardened to block the flow of ink through the pores formed in mesh fabric 54.

Placed on top of screen 50, image carrier 42 and vacuum frame 26 is a vacuum blanket 58 which is composed of a flexible cover 60, which may be opaque, and a sealing frame 62. Sealing frame 62 is pivotally connected to vacuum frame 26 with a hinge 64. Hinge 64 allows vacuum blanket 58 to be pivoted away from vacuum frame 26 to allow screen 50 to be placed into, and taken out of, apparatus 10. Flexible cover 60 is connected within sealing frame 62 so that cover 60 can completely cover screen 50 and image carrier 42 when sealing frame 62 is placed in abutting relationship with vacuum frame 26. Vacuum blanket 58 is thus used to complete and seal the volume that is to be evacuated with the use of a vacuum and vacuum tube 40.

Figure 5:
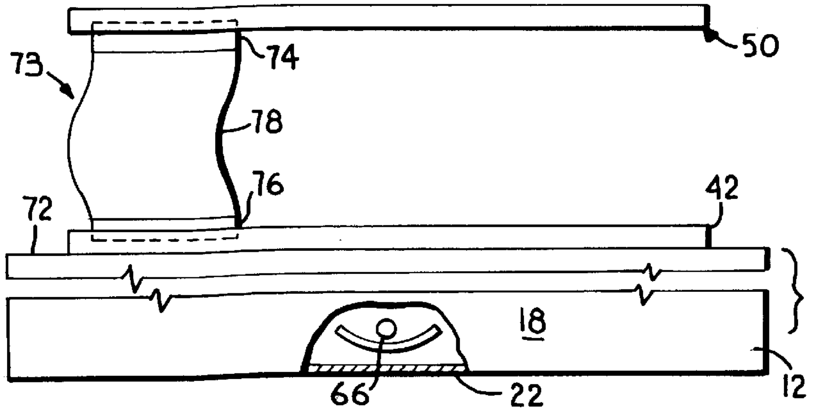
FIG. 5 is a front elevation view of the apparatus of FIG. 4, with parts being broken away to show particular details of construction.

Mounted within exposing frame 12 is a single light source or a series of light sources 66. A variety of light sources 66 may be used, including ultraviolet (UV), fluorescent, metal halide, quartz, pulse xenon and incandescent lights. Light sources 66 are used to cure or harden portions of stencil coating material 56. Other light sources could, of course, be used, provided that they are capable of hardening stencil coating 56. When lower intensity light sources, such as fluorescent tubes, are used, a plurality of lights 66 are used and are mounted in close proximity to top wall 24 as shown in FIG. 2. Alternatively, when a light source 66 is used which has a higher intensity, such as a metal halide light, a single light may be used and may be spaced a greater distance from top wall 24, as shown in FIG. 5. Light sources 66 are mounted in sockets within exposing frame 12, (not shown) in a manner that is well-known in the art. Preferably, the light source used to cure the stencil coating material 56 is UV light. Exposing frame 12 has a power supply cord 68 extending therefrom which supplies the sockets for light sources 66 with the electricity needed to activate or illuminate light sources 66.

In operation, mesh fabric 54 is stretched across and secured to outer frame 52 to form screen 50. Thereafter, uncured stencil coating material 56 is spread across polyester mesh fabric 54. Screen 50 is then placed within apparatus 10 and specifically on top of support surface 48. Sealing frame 62 is thereafter lowered so that it is in abutting relationship with vacuum frame 26. Vacuum blanket 58 will therefore cover screen 50, image carrier 42 and the top surface of vacuum frame 26. A vacuum is thereafter applied through vacuum tube 40 so that the air is evacuated from the volume formed by exposing frame 12, vacuum frame 26 and sealing frame 62. After the vacuum is applied, vacuum blanket 58 will be drawn against the upper most surfaces of vacuum frame 26, image carrier 42 and screen 50 as best seen in FIG. 2.

Figure 3:
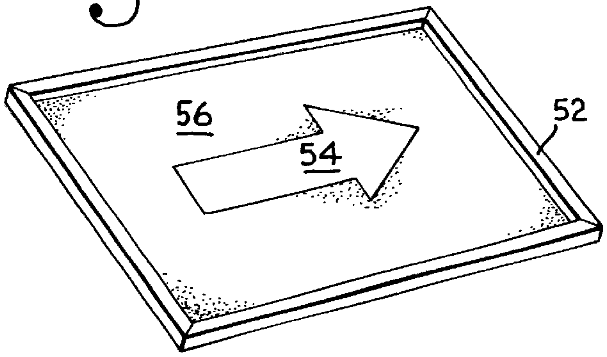
FIG. 3 is a perspective view of a screen printing screen formed by the apparatus shown in FIG. 1.

Computer 44 is thereafter utilized to supply image carrier 42 with a desired image. As shown in FIGS. 1 and 3, this image is an arrow. The image provided will block the transmission of light from light sources 66 to screen 50 in the area covered by the image. The image thus acts as an exposure mask or shield so that only the stencil coating which is not covered by the image is cured. After the image has been supplied to image carrier 42, light sources 66 are activated to supply a source of light to screen 50. The light being emitted from light sources 66 will only expose those surfaces of screen 50 and stencil coating material 56 which are not blocked by the image. Light sources 66 remain activated for a time sufficient to cure or harden the desired portions of stencil coating material 56. In the alternative embodiment, wherein a high resolution monochrome monitor is used for image carrier 42, the image carrier 42 eliminates the need for separate light sources 66. Thus, it is image carrier 42 that provides the light necessary to cure stencil coating material 56. Vacuum blanket 58, being opaque, acts to prevent the light from passing beyond screen 50 so that the only curing agent acting upon stencil coating 56 is the light directly emitted from light sources 66. Therefore, as best seen in FIGS. 1 and 3, by supplying image carrier 42 with a desired image that will block the light from light sources 66, only the stencil coating material 56 which is not in the areas corresponding to the image will be hardened. After stencil coating 56 has been cured in the desired areas, the vacuum is disengaged, the vacuum seal is broken and sealing frame 62 is pivoted away from vacuum frame 26. Screen 50 is then removed from apparatus 10. The stencil coating material 56 remaining on screen 50 which has not been hardened in the area of the image can be rinsed or washed away with water. The area of the arrow, as shown in FIG. 3, will be free from stencil coating material 56 after it has been rinsed, leaving only the mesh fabric 54. Therefore, screen 50 is now ready for use as a screen printing screen with the area of the arrow being the area through which ink will flow.

Figure 4:
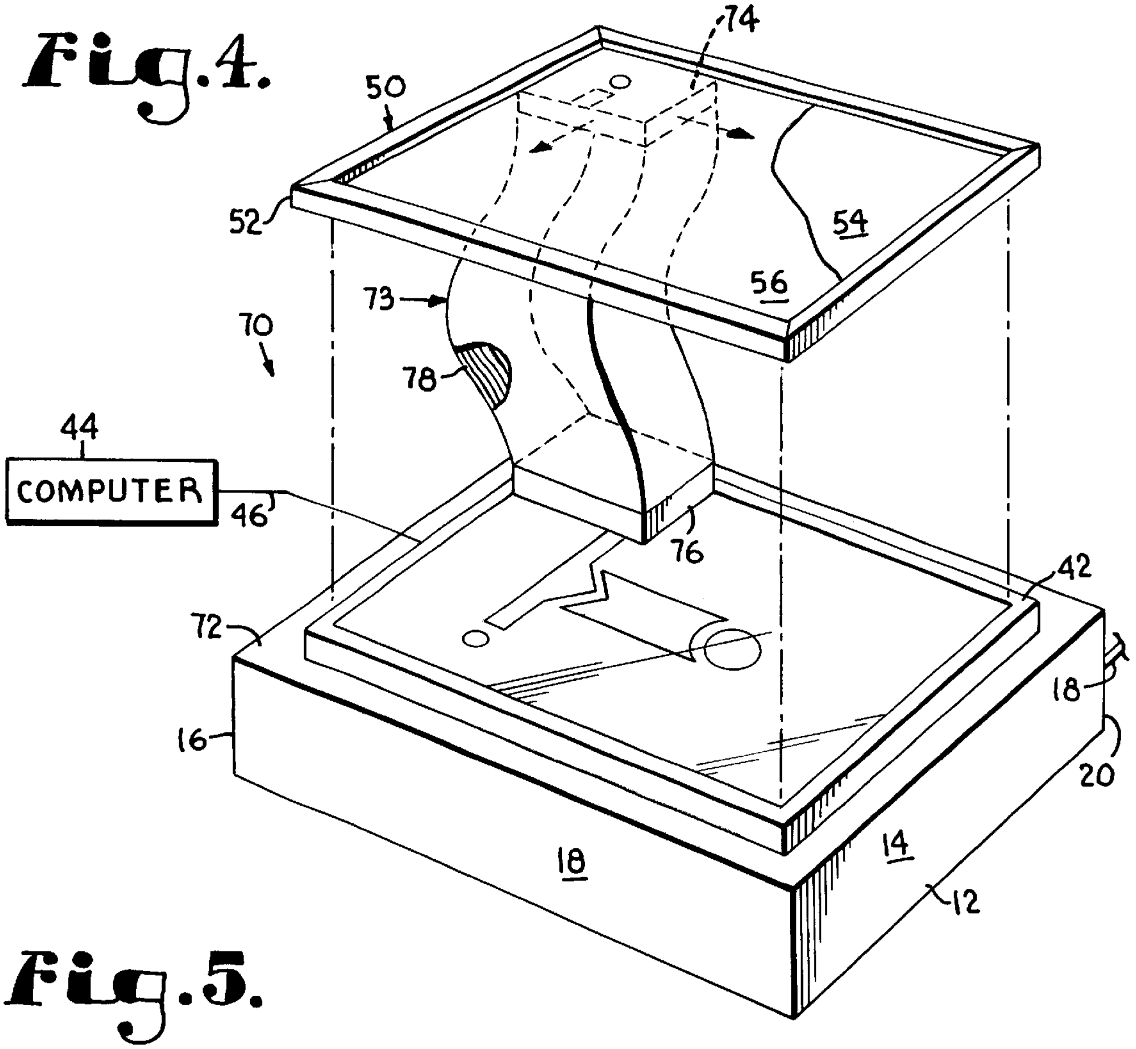
FIG. 4 is a partially schematic perspective view of an apparatus for making a screen printing screen according to another embodiment of the present invention.

An alternate embodiment of the present invention is depicted in FIGS. 4 and 5, with like parts being indicated with like numerals. Referring now to FIG. 4 in greater detail, a screen preparation apparatus in accordance with another embodiment of the present invention is represented broadly by the numeral 70. Apparatus 70 has an exposing frame 12 constructed according to the description above. Apparatus 70 is not equipped with a vacuum frame as in the previous embodiment. Rather, image carrier 42 rests directly upon a top surface 72 of top wall 24 of exposing frame 12. Further, in this embodiment, screen 50 is held in a spaced relationship from image carrier 42 by a locating frame, which is not shown.

In order to properly expose stencil coating material 56 on screen 50 a fiber optic array 73 is used to couple image carrier 42 and screen 50 in light communicating fashion. Fiber optic array 73 has a first end block 74 that is placed in abutting relationship with the bottom of screen 50. First end block 74 is connected to a second end block 76 with a series of fiber optic bundles 78. Thus, first end block 74, second end block 76 and fiber optic bundles 78 form fiber optic array 73. First end block 74 and second end block 76 are preferably generally rectangular and may be of the same size so that each covers the same cross-sectional area Further, while first end block 74 and second end block 76 may cover the entire surface of screen 50 and image carrier 42, respectively, each end block can alternatively cover only a fraction of screen 50 and image carrier 42, as shown in FIG. 4. When end blocks 74 and 76 are only a fraction of the area of screen 50 and image carrier 42, it is preferred that the area covered by end blocks 74 and 76 be an even fraction of the area of screen 50 and image carrier 42; for example one-quarter or one-eighth. It is sometimes advantageous for first end block 74 to be smaller than second end block 76. The use of a smaller end block 74 as compared to end block 76 allows the resolution of the image formed on screen 50 to be increased.

Second end block 76 is placed in abutting relationship with the top surface of image carrier 42, and is used along with fiber optic bundles 78 and first end block 74 to communicate light transmitted through image carrier 42 to screen 50. The pattern of light passing through image carrier 42 will be maintained by second end block 76, fiber optic bundles 78 and first end block 74 so that the pattern of light passing through image carrier 42 is communicated in the same pattern to screen 50.

In use, mesh fabric 54 of screen 50 is coated with stencil coating material 56 and is placed in spaced relationship with image carrier 42. Thereafter, computer 44 supplies image carrier 42 with the image desired to be transformed onto screen printing screen 50. First end block 74 and second end block 76 are thereafter placed in abutting relationship with screen 50 and image carrier 42 respectively. Second end block 76 is placed in a known location on image carrier 42 and first end block 74 is placed in a corresponding location on screen 50. Thereafter, light sources 66 are activated to transmit light through image carrier 42 in those areas not covered by the image supplied by computer 44. Second end block 76 will transmit the light being passed through image carrier 42 to first end block 74 through fiber optic bundles 78. Therefore, the light passing through image carrier 42, second end block 76, fiber optic bundles 78 and end block 74 will be transmitted to screen 50. The light so transmitted acts to cure or harden stencil coating 56 in the areas of screen 50 which are contacted by the light. The light passing through image carrier 42 in the areas not covered by second end block 76 generally lacks the intensity required to cure stencil coating 56. If necessary, a blocking shield may be placed between image carrier 42 and screen 50 to ensure that portions of screen 50 are not prematurely cured in undesired areas. Further, the length of fiber optic bundles may be increased to ensure that undesired portions of screen 50 are not cured. It is possible, if an extremely light-sensitive coating is used, to place screen 50 in a separate room from exposing frame 12 and image carrier 42 so that the possibility of curing stencil coating 56 on undesired areas of screen 50 is substantially reduced. When the portion of the screen covered by first end block 74 has been cured in those areas desired, first end block 74 and second end block 76 are moved to a new location on screen 50 and image carrier 42 respectively. In this embodiment, the exposure of screen 50 is done in a number of discrete steps by moving second end block 76 and first end block 74 to corresponding locations on image carrier 42 and screen 50. Alternatively, second end block 76 can cover the entire area of image carrier 42 and first end block 74 can cover the entire area of screen 50, thereby alleviating the need to relocate the end blocks. After screen 50 has been selectively exposed to light sources 66, it is removed from the locating frame of apparatus 70 and the uncured portions of stencil coating 56 are rinsed therefrom. After this rinsing, screen 50 is ready for use. When ink is placed on screen 50 and forced through the remaining open pores of the screen, the graphic will be transferred onto the substrate positioned under screen 50.

Figure 6:
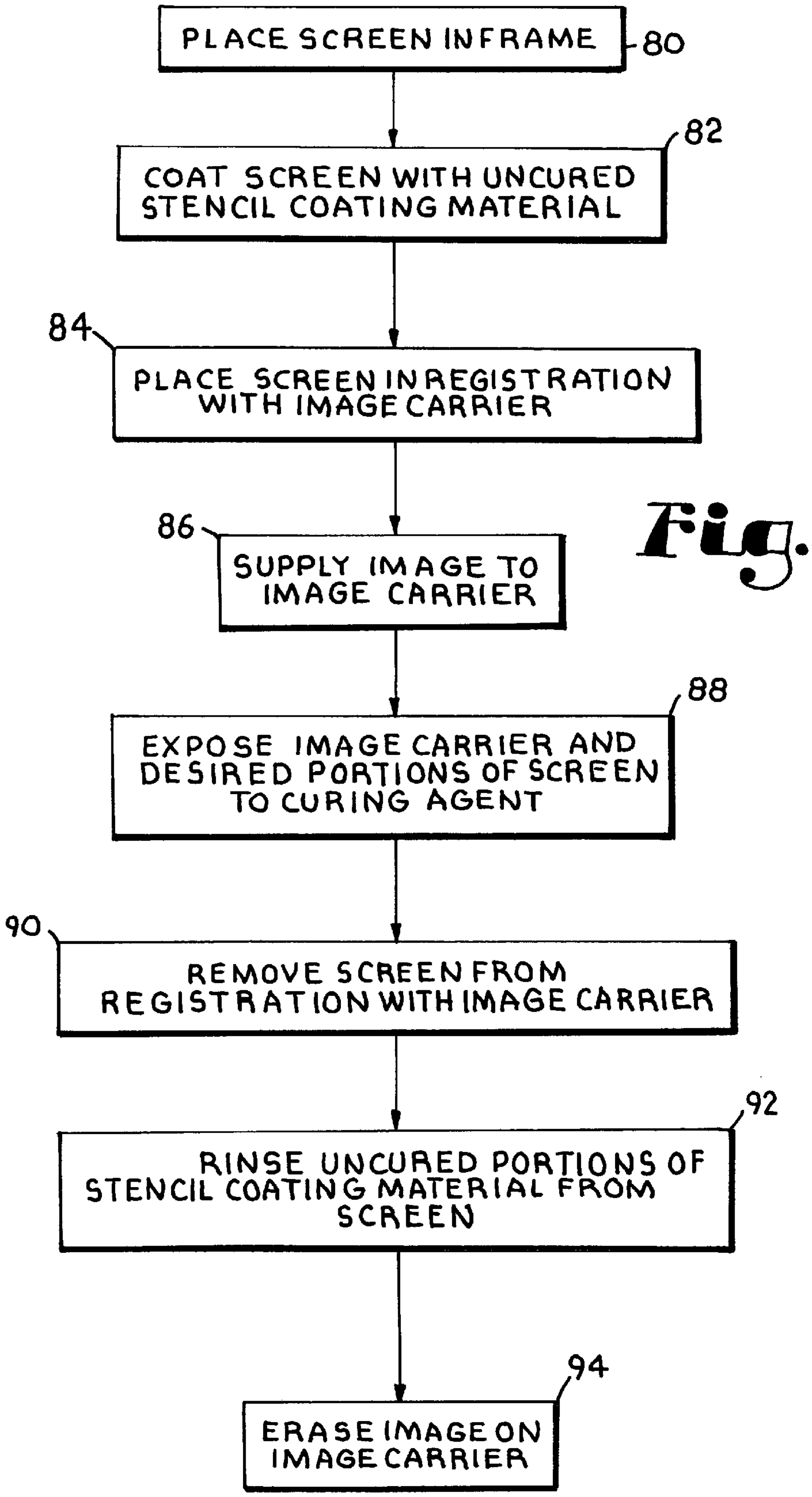
FIG. 6 is a diagram representing the steps used in the method of the present invention.

As can be seen in FIG. 6, the process of the present invention comprises placing a screen within a frame, as shown in box 80. The screen is then coated with an uncured stencil coating material and placed in registration with an image carrier, as represented by boxes 82 and 84. After the coated screen is placed in registration with the image carrier, the image carrier is supplied with an image, as shown in box 86. Preferably, the image carrier is connected to a computer which is responsible for supplying the image to the image carrier. As shown in step 88, with the image on the image carrier, the image carrier and select portions of the screen are exposed to a curing agent. The curing agent can be any agent capable of hardening the uncured stencil coating material, such as a fluorescent or metal halide light. The image supplied to the image carrier will block the passage of the curing agent so that the uncured stencil coating material on the portions of the screen in registration with the image will remain uncured and will not be hardened. After the desired portions of the stencil coating material have been sufficiently hardened, the screen is removed from registration with the image carrier, as shown in box 90. The screen is then rinsed with water or other rinsing material so that the remaining uncured stencil coating material on the screen is removed, as represented in FIG. 6 by box 92. The screen will at this time consist of a portion of hardened stencil coating material and a portion of screen with no stencil coating material, which is an area through which ink can flow. In the embodiment of this invention where the image carrier is reimagable, the image on the image carrier may be erased any time after the screen is cured. The erasing of the image is shown by box 94 in FIG. 6.

As can be seen from the above description, the apparatus and method of the present invention provides for a more efficient formation of a screen printing screen. The need for forming a separate transparent sheet with a permanent opaque image thereon is eliminated. There is no need to create new artwork, in the form of transparent sheets, for each new graphic desired to be formed on the printing screens. Instead, computer 44 is used to supply image carrier 42 with the desired image. Further, through the use of computer 44 and image carrier 42, the image formed on the screen printing screen can readily be changed and modified as the need arises.

The method and apparatus of the present invention also eliminate the disadvantages associated with printing an ink barrier coating on top of the stencil coating. The use of image carrier 42 eliminates the need for the ink barrier coating, as the image supplied to image carrier 42 effectively blocks the light from passing through the image carrier. Therefore, the concern regarding the compatibility of the ink barrier and stencil coating materials is eliminated.

The method and apparatus of the present invention also eliminate the concern regarding the optical density of an ink barrier coating. Computer 44 provides image carrier 42 with an opaque image. The image provided will create, on image carrier 42, an area of sufficient optical density to prevent light from being communicated therethrough. Thus, any concerns regarding the optical density of an ink barrier are eliminated.

From the foregoing, it will be seen that this invention is one well adapted to obtain all of the ends and objects hereinabove set forth, together with other advantages which are inherent to the structure. It will be understood that certain features and subcombinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A thermoresponsive coloring formulation, comprising the mixture of:

a color changing dye selected from the group consisting of a mononitrospirobenzopyran, a dinitrospirobenzopyran, a mononitrospironaphthopyran, and a dinitrospironaphthopyran; and a polymer containing a nitro group that activates said color changing dye upon exposure to heat, wherein said, formulation is thermoresponsive and reversibly changes colors.

2. The coloring formulation of claim 1, wherein said polymer that activates said color changing dye is selected from the group consisting of cellulose mononitrate, cellulose dinitrate, and cellulose trinitrate.

3. The coloring formulation of claim 1, further comprising:

a solvent.

4. The coloring formulation of claim 3, wherein said solvent is an alcohol having from 3 to 6 carbon atoms.

5. The coloring formulation of claim 4, wherein said alcohol is n-propyl alcohol or isopropyl alcohol.

6. The coloring formulation of claim 2, wherein said solvent is an alkyl acetate having from 2 to 7 carbons.

7. The coloring formulation of claim 6, wherein said alkyl acetate is ethyl acetate or n-propyl acetate.

8. The coloring formulation of claim 2, wherein said solvent is about a 50/50 mixture by volume of an alcohol and an acetate.

* * * * *